Sept. 2, 1958
H. GROTE
2,850,124
BRAKE WITH RESILIENT FRICTION DISC
Filed March 27, 1953
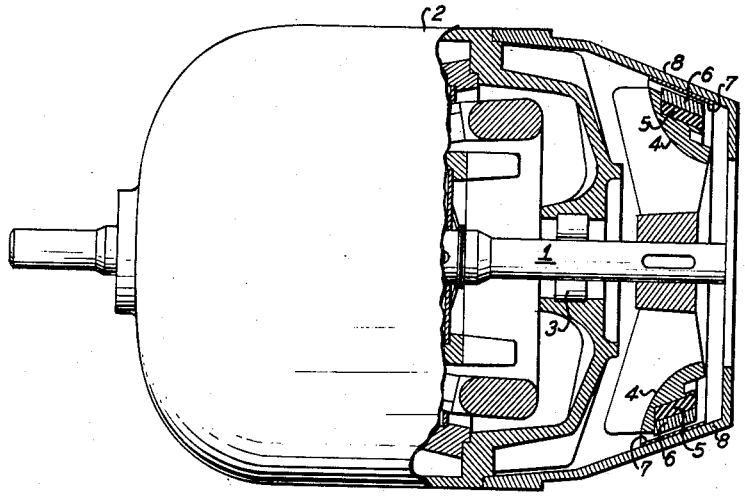
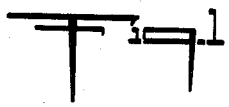
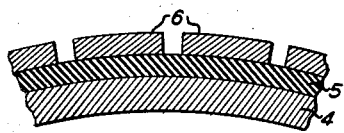 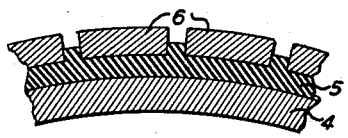
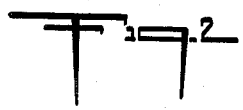 
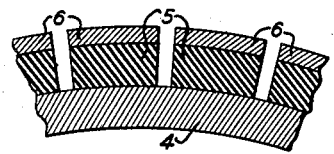
INVENTOR
HUGO GROTE
BY
ATTORNEYS

United States Patent Office 2,850,124
Patented Sept. 2, 1958

2,850,124

BRAKE WITH RESILIENT FRICTION DISC

Hugo Grote, Wetter (Ruhr), Germany, assignor to Damag-Zug G. m. b. H., Wetter (Ruhr), Germany, a German company Application March 27, 1953, Serial No. 345,053

2 Claims. (Cl. 188—251)

The invention relates to a friction brake which is operated by the axial displacement of a part carrying one of its friction surfaces. Brakes of this type are, for example, used in conjunction with a motor having a displaceable armature, on the shaft of which the displaceable part of the brake is secured, and which is pressed by a spring against the stationary friction surface when the current has been switched-off. Heavy axial impacts occur as a result of the mass action of the axially moved parts, the result being a short-time increase of the braking moment, so that the torsional stresses on the driving shaft and the tensional stresses on the securing means for the stationary friction surface are considerably increased. In order to reduce impacts, it has been known to insert oil dampers between the shaft, and the friction disc provided thereon. These oil dampers, however, are not satisfactory, because they reduce the speed at which the brake engages, which in most cases is undesirable. Furthermore, such dampening devices require considerable servicing.

Neither can the object aimed at be achieved by using steel springs as the dampening means. The springs accumulate energy, so that they have a recoil effect, the consequence being that a brake provided with such springs as the dampening means, is released and closed several times after engagement, because the forces accumulated in the dampening springs counteract the force (brake spring) effecting the frictional engagement.

The invention provides an alternative way of reducing the axial impacts.

According to the invention, the dampening device used is a resilient means, preferably of rubber with high internal friction. Means of this type have only a low recoil effect, because they convert into heat the greater part of the compressive forces acting thereon. For example, this means is provided in the form of a ring between the hub of the rotating friction disc and the brake-lining thereon, or between the non-rotating friction brake ring and the support thereof. It may be secured by being vulcanised-on or glued-on, so that neither screws nor rivets are necessary for the purpose.

A particular advantage of the invention consists in that the dampening device is not only effective in the axial direction, but also in the direction of rotation.

One constructional example of the invention is illustrated in Figure 1 of the drawings in conjunction with a motor with displaceable armature. Figures 2, 3 and 4 show different constructions of the dampening device.

On the drive shaft 1 projecting from the motor 2 of the kind having a displaceable armature, there is secured at a position beyond a bearing 3, a friction disc 4, which operates both as a brake and as a releasing means. A rubber friction ring 5 is provided between a friction ring 6 and the friction disc 4 serving at the same time as the support for the friction ring 6. The rubber ring 5 is vulcanised or glued on to the friction disc 4, and the friction ring 6 is likewise secured to the rubber ring 5. A stationary friction ring 7 forms part of the motor housing 8.

Braking can be rendered particularly resilient by the brake ring 6 being formed of individual blocks or segments as illustrated in Figure 2. Small inaccuracies in the mounting and alignment of the friction disc 4 relatively to the non-rotating brake ring 7 are thus rendered innocuous. The free space between the segments also assists in the dissipation of the heat engendered by friction.

A further modification of the invention consists in mounting the individual segments of a divided brake ring in recesses of an undivided dampening body 5 as shown in Fig. 3; the tangential stresses of the segments are then transmitted from the lateral walls of the segments 6 to the dampening body 5. The dampening body 5 may be composed of individual sections in the same way as the brake ring 6 in order to improve the heat dissipating effect, in the manner illustrated in Figure 4.

I claim:

1. In combination with a quick acting friction brake for a motor with a displaceable armature wherein an axially displaceable rotatable shaft carries a radially extending member having a circumferential engageable friction surface, a coaxial stationary ring member is provided with an engageable friction surface, one of said surfaces is shaped as the inner surface of the frustum of a cone, the other of said surfaces is shaped as the outer surface of a substantially identical frustum of a cone and said surfaces are normally out of contact and brought into contact by axial displacement of said shaft, that improvement wherein one of said members comprises a solid non-resilient backing having an outer peripheral surface of the same shape as the friction surfaces, intermediate resilient rubber means fixed on said backing and surrounding same and friction means secured on said rubber means to provide one of said engageable friction surfaces and said rubber means is formed of rubber having high internal friction, and said rubber means being compressed radially when said friction surfaces are engaged.

2. The device set forth in claim 1 wherein said rubber means comprises a continuous rubber ring and said friction means comprises a plurality of individual segments mounted on said rubber ring.

References Cited in the file of this patent

UNITED STATES PATENTS

| | | |
|---|---|---|
| 1,872,547 | Zeder | Aug. 16, 1932 |
| 1,987,194 | Kingston | Jan. 8, 1935 |
| 2,175,382 | Eason | Oct. 10, 1939 |
| 2,212,422 | Hoppenstand | Aug. 20, 1940 |
| 2,214,762 | Eksergian | Sept. 17, 1940 |
| 2,236,311 | Eksergian | Mar. 25, 1941 |
| 2,381,378 | Brown | Aug. 7, 1945 |
| 2,451,329 | Gaenssle | Oct. 12, 1948 |
| 2,637,345 | Kraft | May 5, 1953 |

FOREIGN PATENTS

| | | |
|---|---|---|
| 134,695 | Germany | Sept. 30, 1902 |